(12) United States Patent
Vidlund et al.

(10) Patent No.: US 11,858,052 B2
(45) Date of Patent: Jan. 2, 2024

(54) DRILL UNIT WITH A MOTOR UNIT AND A GEAR UNIT

(71) Applicant: HUSQVARNA AB, Huskvarna (SE)

(72) Inventors: Robert Vidlund, Lerum (SE); Pär Carlsson, Hyssna (SE); Peter Liljenfeldt, Kungsbacka (SE); David Grennhag, Kållered (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/670,581

(22) Filed: Feb. 14, 2022

(65) Prior Publication Data
US 2022/0258256 A1    Aug. 18, 2022

(30) Foreign Application Priority Data

Feb. 15, 2021    (SE) .................................... 2150163-0

(51) Int. Cl.
*B23B 45/00* (2006.01)
*B25B 23/14* (2006.01)
*F16H 35/10* (2006.01)

(52) U.S. Cl.
CPC .......... *B23B 45/008* (2013.01); *B25B 23/141* (2013.01); *F16H 35/10* (2013.01); *B23B 2260/044* (2013.01); *B23B 2260/122* (2013.01)

(58) Field of Classification Search
CPC ............ B23B 45/008; B23B 2260/122; B23B 2260/044; B25B 23/141; F16H 35/10
See application file for complete search history.

(56) References Cited

U.S. PATENT DOCUMENTS 1,828,903 A * 10/1931 Whitfield .............. B23B 45/001
                                                              200/332.2
2,456,571 A * 12/1948 Turner ................. B23Q 11/127
                                                                 310/58
(Continued)

FOREIGN PATENT DOCUMENTS

DE            1944660 A1    3/1971
DE     112012005687 T5    10/2014
(Continued)

OTHER PUBLICATIONS

Search Report and Office Action for Swedish Application No. 2150163-0 dated Sep. 10, 2021.

*Primary Examiner* — Andrew M Tecco
*Assistant Examiner* — Nicholas E Igbokwe
(74) *Attorney, Agent, or Firm* — Burr & Forman LLP (57) ABSTRACT

The present disclosure relates to a drill tool (1), such as a core drill tool (1), comprising a motor unit (2) and a gear unit (3). The motor unit (2) comprises an electric motor (4) and a motor drive shaft (5) that extends along a first longitudinal axis (6) from the electric motor (4) and protrudes out of a motor unit housing (7) via a motor exit aperture (8) in a housing end part (9) and comprises a drive shaft gear (10). The drive shaft gear (10) is adapted to propel a drill shaft (14) that extends along a second longitudinal axis (15) and comprises a tool holder (16) that is adapted to hold a tool. The housing end part (9) comprises a wall part (17) arranged transversally to the longitudinal axes (6, 15) and is adapted to close the gear unit cavity (11) and to separate the electric motor (4) from the gear unit cavity (11).

16 Claims, 7 Drawing Sheets

(56) References Cited

U.S. PATENT DOCUMENTS

| | | | | |
|---|---|---|---|---|
| 4,158,313 A * | 6/1979 | Smith | ............ | B25D 16/00 |
| | | | | 74/423 |
| 2005/0061524 A1* | 3/2005 | Hagan | ............ | B25F 5/02 |
| | | | | 173/217 |
| 2010/0014932 A1* | 1/2010 | Albinsson | ............ | B28D 7/02 |
| | | | | 408/56 |
| 2015/0041170 A1* | 2/2015 | Yoshikane | ............ | B25D 11/06 |
| | | | | 173/104 |
| 2017/0368673 A1* | 12/2017 | Kunz | ............ | B25D 11/12 |

FOREIGN PATENT DOCUMENTS

| | | |
|---|---|---|
| EP | 0666145 A1 | 8/1995 |
| JP | 63123678 A | 5/1988 |
| WO | 2008026987 A1 | 3/2008 |

\* cited by examiner

DRILL UNIT WITH A MOTOR UNIT AND A GEAR UNIT

TECHNICAL FIELD

The present disclosure relates to a drill unit and comprises a motor unit and a gear unit.

BACKGROUND ART

Construction machines are for example used when renovating, reconstructing and extending buildings. Drill motors with rotatable drive shafts are normally used for drilling holes, for example for piping in floors and walls of buildings, where a motor drive shaft is connected to a separate gear unit. From the gear unit, a drill shaft extends and comprises a tool holder that is adapted to hold a tool, such as a concrete drill.

The connection between the motor drive shaft and the gear unit is made by the motor drive shaft protruding out from the motor via a motor exit aperture and into the gear unit via a gear unit receiving aperture.

In view of the above, it is desired to lower the risk of bending of the motor drive shaft, and to reduce manufacture cost as well as size and weight.

SUMMARY

It is an object of the present disclosure to provide a drill unit where there is a reduced risk of bending of the motor drive shaft, and with reduced manufacture cost as well as size and weight compared with state of the art drill units.

This object is achieved by means of a drill tool, such as a core drill tool, comprising a motor unit and a gear unit. The motor unit comprises an electric motor and a motor drive shaft that extends along a first longitudinal axis from the electric motor and protrudes out of a motor unit housing via a motor exit aperture in a housing end part and comprises a drive shaft gear. The gear unit comprises a gear unit housing with a gear unit cavity that in turn comprises at least one cavity gear, where the drive shaft gear is adapted to mate with a cavity gear that at least indirectly is adapted to propel a drill shaft that extends along a second longitudinal axis and comprises a tool holder that is adapted to hold a tool. The housing end part comprises a wall part arranged transversally to the longitudinal axes and is adapted to close the gear unit cavity and to separate the electric motor from the gear unit cavity.

This means that the gear unit does not comprise any wall part facing the motor unit housing, reducing the number of parts and material needed. This results in a drill unit which has a reduced size and weight which leads to reduced manufacture cost. Furthermore, the reduced size is due to a reduced length along the longitudinal axes, which means that the motor drive shaft has a reduced length which lowers the risk of bending of the motor drive shaft.

According to some aspects, the gear unit housing and the motor unit housing together are comprised in a drill tool main housing. This provides a compact and streamlined drill tool.

According to some aspects, the motor unit housing and/or the gear unit housing comprises a circumferentially running slot that is adapted to receive a sealing gasket that is adapted to function as a seal between the gear unit housing and the motor unit housing. In this way, an improved sealing between the motor unit and the gear unit is obtained.

According to some aspects, the housing end part comprises a circumferentially running sealing flange that extends from the wall part towards and into the gear unit cavity parallel to the longitudinal axes, such that the sealing flange and the gear unit cavity overlap in a direction perpendicular to the longitudinal axes.

According to some aspects, the sealing flange and the gear unit housing have corresponding surfaces that are parallel to, and circumvent, the longitudinal axes. The surfaces have complementary shapes where they abut each other.

In this way, improved rigidity and sealing between the motor unit and the gear unit is obtained.

According to some aspects, the surfaces follow non-cylindrical shapes around the longitudinal axes.

According to some aspects, the sealing flange comprises a circumferentially running slot that is adapted to receive a sealing gasket that is adapted to function as a seal between the gear unit housing and the motor unit housing. In this way, an improved sealing between the motor unit and the gear unit is obtained.

According to some aspects, the housing end part comprises a circumferentially running first supporting flange that extends from the wall part towards and into the gear unit cavity parallel with the first longitudinal axis. The first supporting flange comprises the motor exit aperture and holds a bearing arrangement for the motor drive shaft, which motor drive shaft extends through the first supporting flange. This provides support for the motor drive shaft and accommodation for the bearing arrangement.

According to some aspects, the housing end part comprises at least one circumferentially running further supporting flange that extends from the wall part towards and into the gear unit cavity along an axis parallel with the first longitudinal axis. Each further supporting flange holds a corresponding bearing arrangement that is adapted to receive and support a corresponding gear shaft that is attached to a corresponding gear in the gear unit. In this manner, the gear shafts are securely fixed and journaled According to some aspects, the motor unit housing is attached to the gear unit housing with fastening means. For example, the fastening means engage the gear unit housing and the motor unit housing at a position radially outward of the sealing flange.

According to some aspects, the gear unit cavity accommodates a liquid, such as lubricating oil or grease, and the wall part of the motor unit housing together with the gear unit cavity being arranged to encapsulate said liquid. The liquid can absorb some of the heat generated by the electric motor.

According to some aspects, the drill tool comprises a fan for guiding cooling air towards the motor unit. The cooling air is arranged to be guided to at least one side of the motor unit housing, said side being different from the side of the motor unit comprising the wall part, such that the motor unit is directly cooled by a liquid on one external side and by cooling air on at least one other external side. This way, efficient cooling is enabled.

According to some aspects, the cooling fan is driven by the electric motor and located on a side of the motor unit opposite the side of the motor unit engaging the gear unit cavity.

According to some aspects, the electric motor is powered by a battery.

BRIEF DESCRIPTION OF THE DRAWINGS

In the following, the present disclosure will be described in more detail with reference to preferred embodiments and the appended drawings, where.

DETAILED DESCRIPTION

Aspects of the present disclosure will now be described more fully with reference to the accompanying drawings. The different devices disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
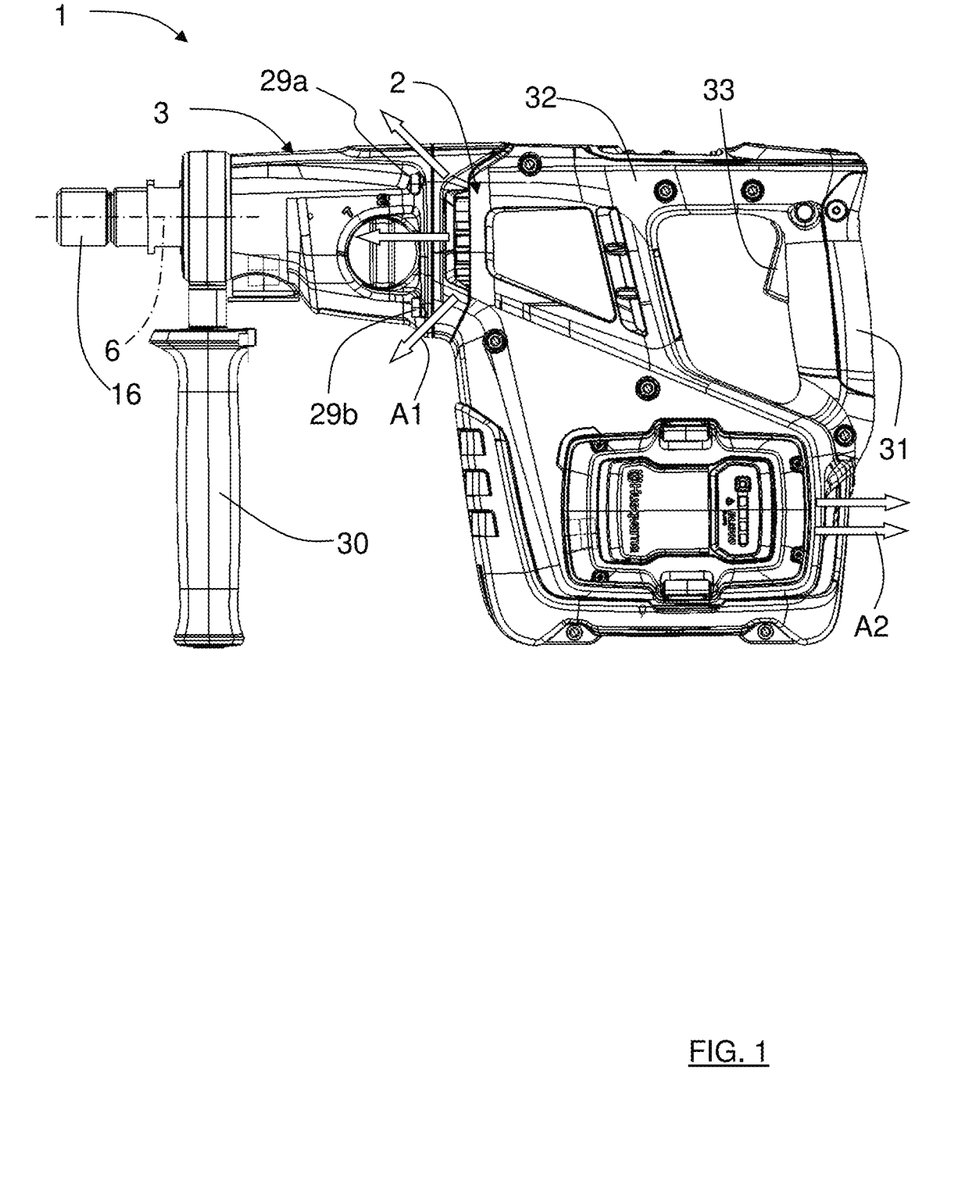
FIG. 1 shows a side view of a core drill unit.
Figure 2:
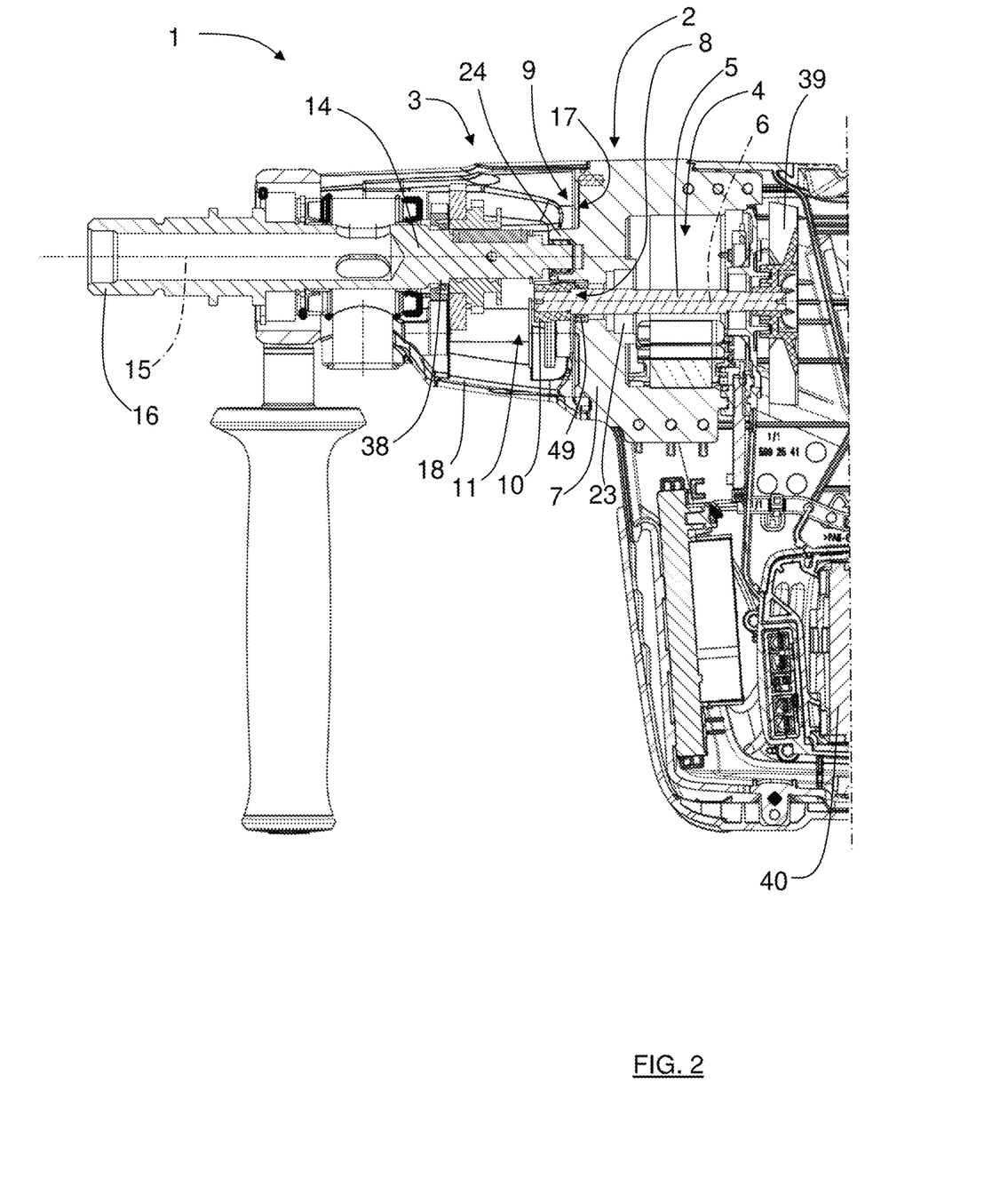
FIG. 2 shows a partial side section view of the core drill unit.

With reference to FIG. 1 and FIG. 2, FIG. 2 being a partial side section view of FIG. 1, there is a core drill unit 1 comprising a motor unit 2, a gear unit 3, a front handle 30 and a rear handle 31 formed in a rear housing part 32, where the rear handle 31 comprises a power switch 33. The core drill unit 1 further comprises a drill shaft 14 that extends along a second longitudinal axis 15 and comprises a tool holder 16 that is adapted to hold a tool. The tool holder is in the form of a spindle shaft.

Figure 3:
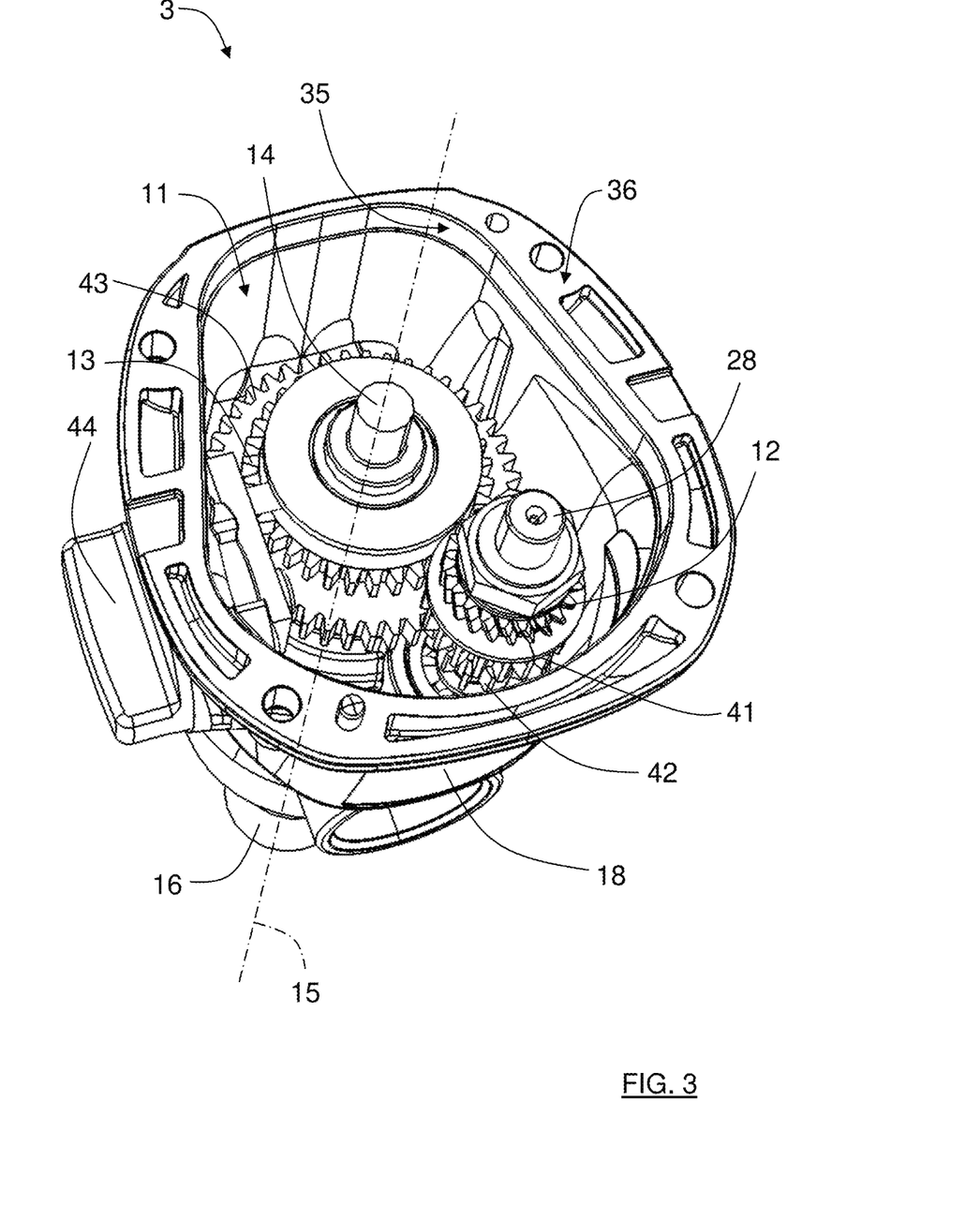
FIG. 3 shows a perspective view of a gear unit.
Figure 4:
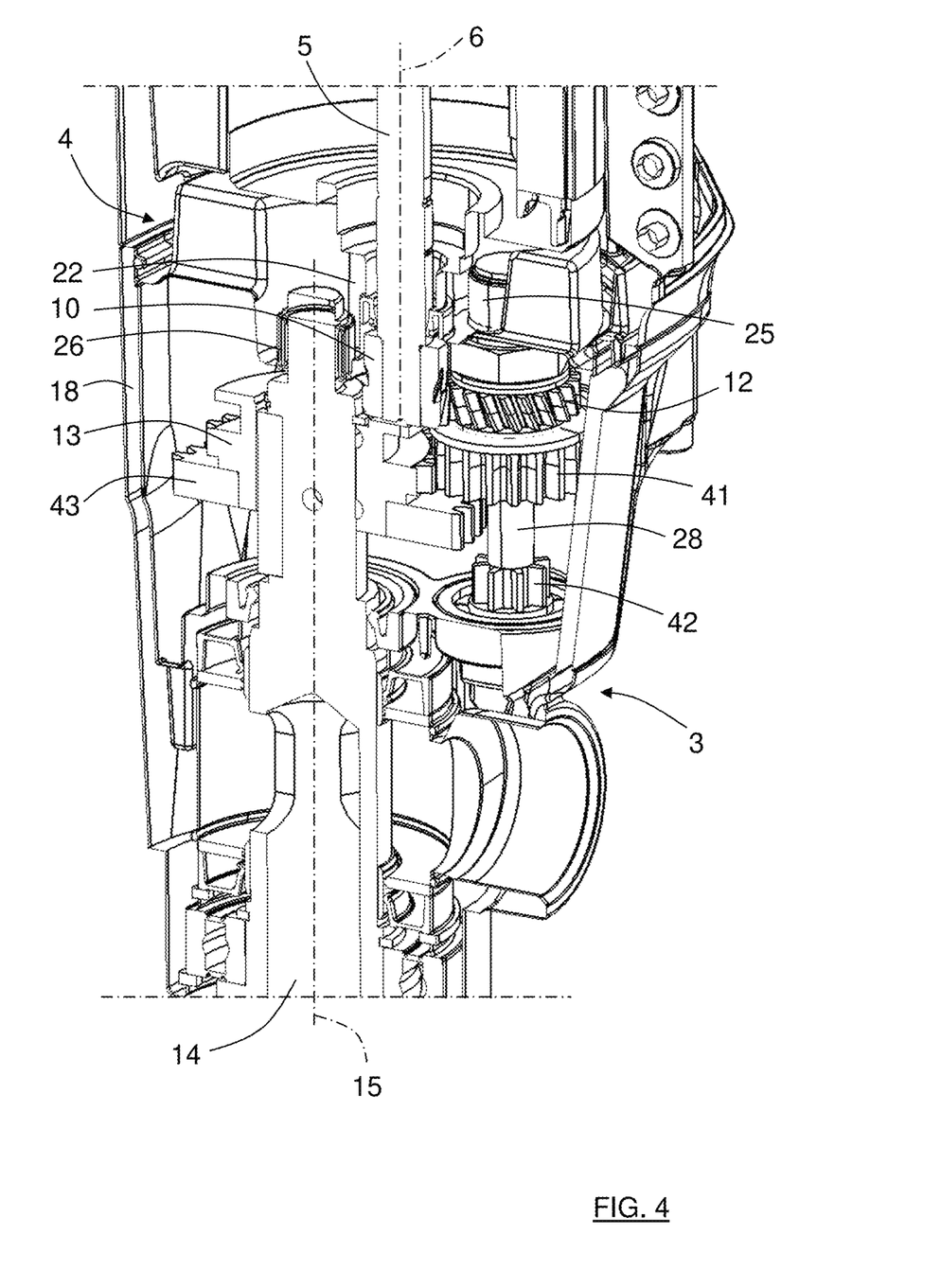
FIG. 4 shows a cut-open section perspective view of a part of the assembled gear unit and electric motor
Figure 5:
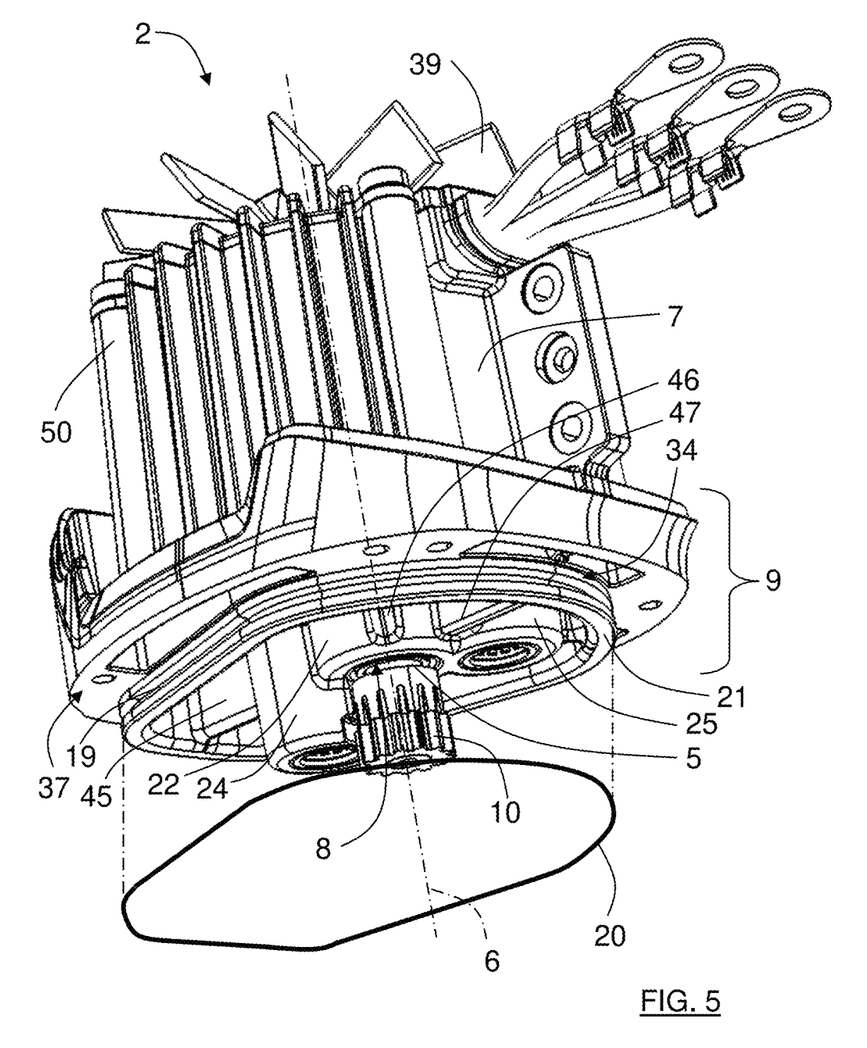
FIG. 5 shows a first perspective view of a motor unit.
Figure 6:
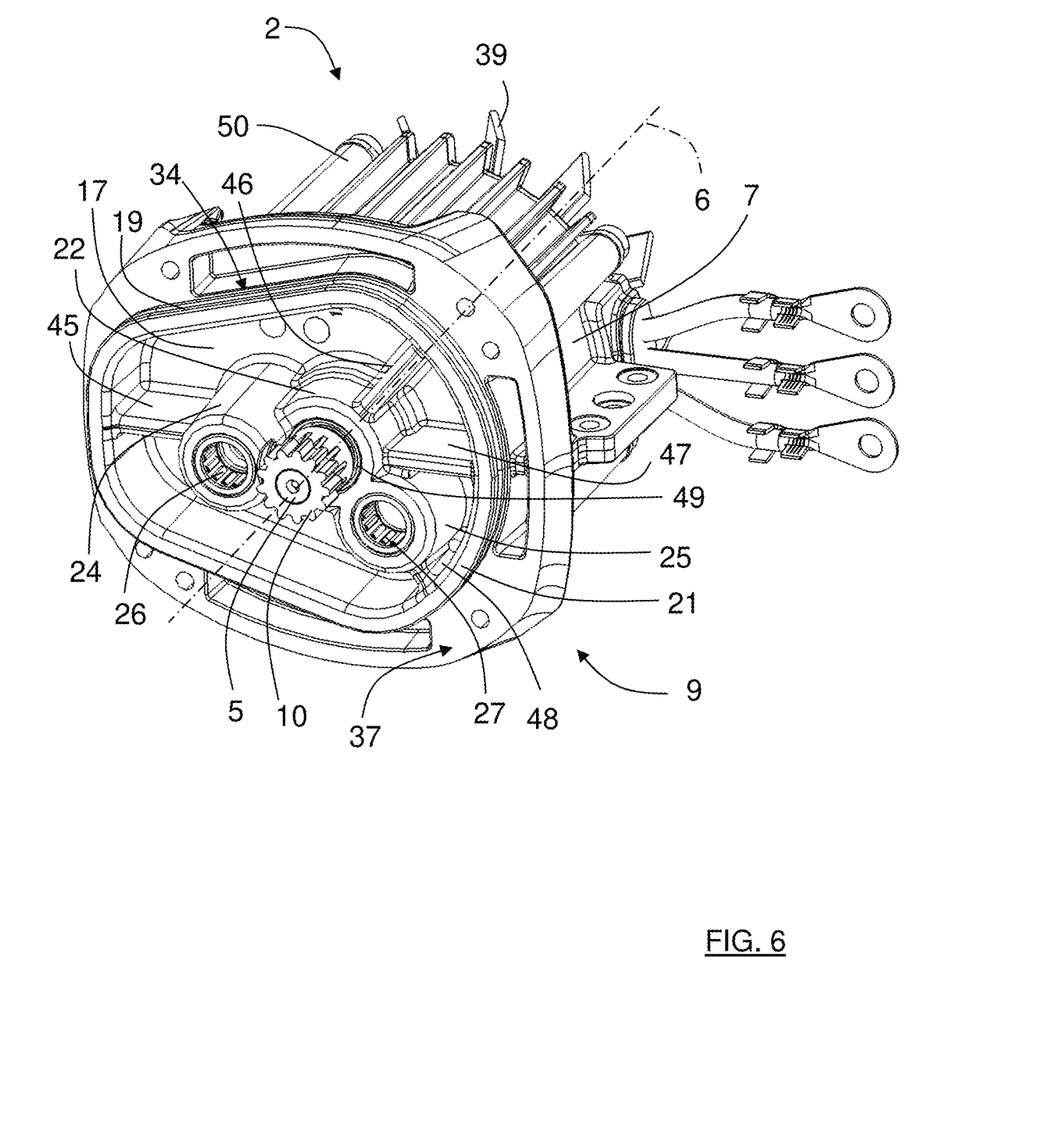
FIG. 6 shows a second perspective view of the motor unit.
Figure 7:
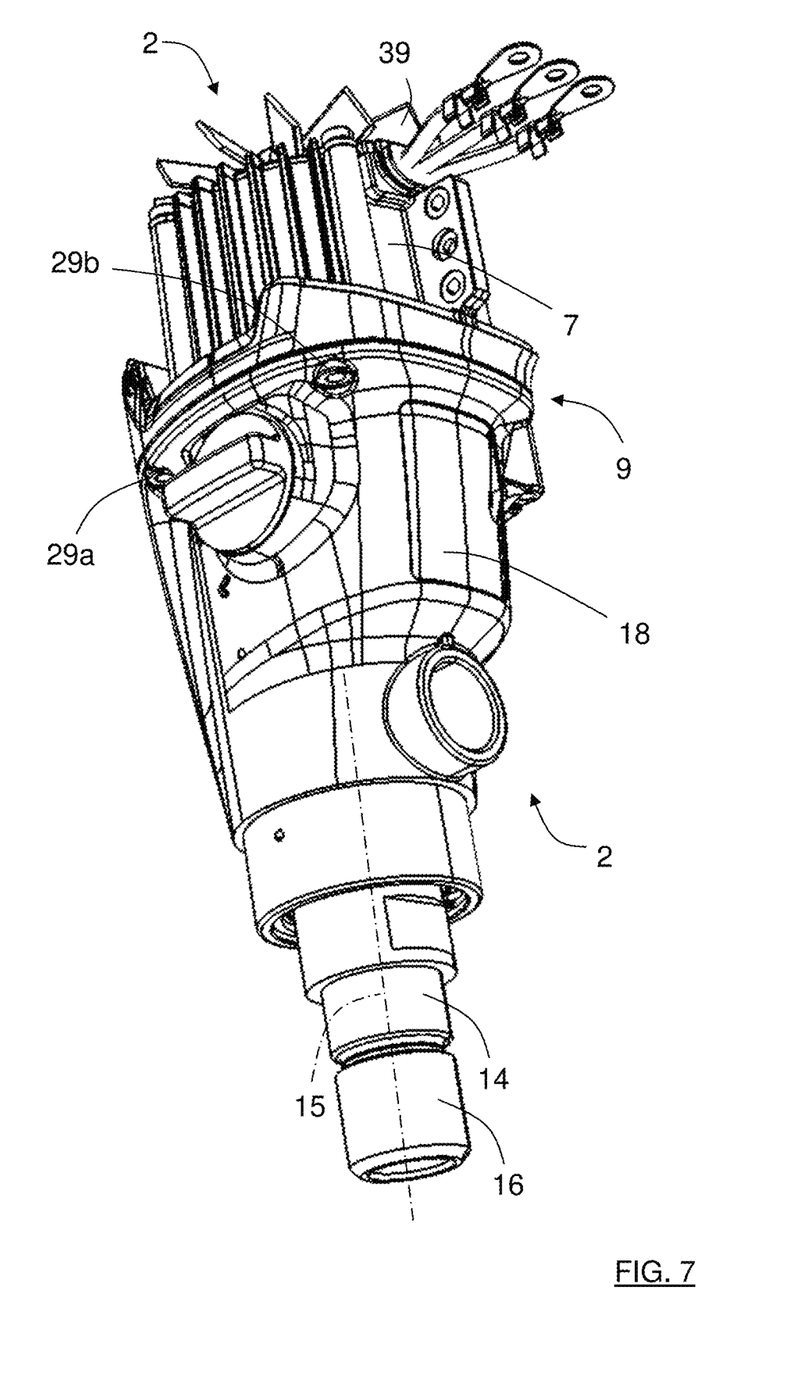
FIG. 7 shows a perspective view of an assembled gear unit and motor unit.

FIG. 3 shows a perspective view of the gear unit 3, FIG. 4 shows a cut-open section perspective view of a part of the assembled gear unit 3 and motor unit 2, FIG. 5 shows a first perspective view of a motor unit 2, FIG. 6 shows a second perspective view of the motor unit 2, and FIG. 7 shows a perspective view of an assembled gear unit 3 and motor unit 2. With reference also to FIG. 3-FIG. 7, the motor unit 2 comprises an electric motor 4 and a motor drive shaft 5 that extends along a first longitudinal axis 6 from the electric motor 4 and protrudes out of a motor unit housing 7 via a motor exit aperture 8 in a housing end part 9 of the motor unit housing 7. The motor drive shaft 5 comprises a drive shaft gear 10.

The gear unit 3 comprises a gear unit housing 18 with a gear unit cavity 11 that in turn comprises at least one cavity gear 12, 13, 41, 42, 43, where the drive shaft gear 10 is adapted to mate with a cavity gear 12 that at least indirectly is adapted to propel the drill shaft 14. This means that the drive shaft gear 10 is adapted to mate with a cavity gear that directly or indirectly, i.e. via at least another cavity gear, is adapted to propel the drill shaft 14.

In this example, there is a first gear shaft 14 and a second gear shaft 28, where the first gear shaft 14 corresponds to the drill shaft 14. An incoming gear 12 is attached to the second gear shaft 28 and is adapted to mate with the drive shaft gear 10. Outgoing gears 13, 43 are attached to the first gear shaft 14 and are adapted to be coupled to the incoming gear 12 by means of intermediate gears 41, 42, where the outgoing gears 13, 43 are attached to the drill shaft 14. More in detail, a first intermediate gear 41 and a second intermediate gear 42 are attached to the second gear shaft 28, and are brought into rotation when the second gear shaft 28 is brought into rotation by the drive shaft gear 10 propelling the incoming gear 12.

In the above context, a gear being attached to a shaft means that the gear is rotationally engaged to that shaft and is adapted to rotate together with that shaft.

For a first gear position, as illustrated in FIG. 4, the first intermediate gear 41 mates with, and engages, a first outgoing gear 13, where the first outgoing gear 13 then is adapted to bring the first gear shaft 14 into rotation, while a second outgoing gear 43 is in an idle state, not engaging any gear. For a second gear position, the outgoing gears 13, 43 are shifted along the second longitudinal axis 15 such that the second intermediate gear 42 mates with, and engages, the second outgoing gear 43 where the second outgoing gear 43 then is adapted to bring the first gear shaft 14 into rotation, while the first outgoing gear 13 is in an idle state, not engaging any gear. Shifting between the gear positions is enabled by means of a shift lever 44 that makes the outgoing gears 13, 43 move along the first gear shaft 14, along the second longitudinal axis 15, while being rotationally engaged with the first gear shaft 14.

According to some aspects, the incoming gear 12 is constituted by a drive wheel and a slip clutch wheel.

Many other gear configurations are possible with more or less gears. It is conceivable that the drive shaft gear 10 is adapted to mate with, and directly propel, the incoming gear 12. According to some aspects, the incoming gear 12 is in the form of a spline that is received in a gear that is adapted to receive the spline. Such a gear may according to some aspects be constituted by the outgoing gear such that there is a straight power transfer where the longitudinal axes 6, 15 coincide.

The housing end part 9 comprises a wall part 17 arranged transversally to the longitudinal axes 6, 15 and is adapted to close the gear unit cavity 11 and to separate the electric motor 4 from the gear unit cavity 11.

In other words, the motor unit housing 7 comprises the only wall part that separates the gear unit cavity 11 and the electric motor 4, the gear unit housing 18 being open towards the wall part 17. This means that the gear unit 3 does not comprise any wall part facing the motor unit housing 7, reducing the number of parts and material needed. This results in a drill unit 1 which has a reduced size and weight which leads to reduced manufacture cost. Furthermore, the reduced size is due to a reduced length along the longitudinal axes 6, 15, which means that the motor drive shaft 5 has a reduced length which lowers the risk of bending of the motor drive shaft.

The unit housing 18 and the motor unit housing 7 together are comprised in a drill tool main housing 7, 18, according to some aspects the drill tool main housing 7, 18 is attached to the rear housing part 32 which for example mainly can be formed in a plastic material.

According to some aspects, the gear unit cavity 11 accommodates a liquid, such as lubricating oil or grease, and the wall part 17 of the motor unit housing together with the gear unit cavity 11 being arranged to encapsulate said liquid. For example, such a liquid can be gear oil or something more viscous such as gear grease, and is used as lubrication for lubricating moving parts within the gear unit.

According to some aspects, the housing end part 9 comprises a circumferentially running sealing flange 21 that extends from the wall part 17 towards and into the gear unit cavity 11 parallel to the longitudinal axes 6, 15, such that the sealing flange 21 and the gear unit cavity 11 overlap in a direction perpendicular to the longitudinal axes 6, 15.

The sealing flange 21 and the gear unit housing 18 have corresponding surfaces 34, 35 that are parallel to, and circumvent, the longitudinal axes 6, 15. The surfaces 34, 35 having complementary shapes where they abut each other. The sealing flange 21 has a flange surface 34 that is a radially outer surface, and the gear unit housing 18 has a housing surface 35 that is a radially inner surface.

In this way, the sealing flange 21 and the gear unit housing 18 form a seal which is desirable since the gear unit cavity 11 can be filled with gear oil that should be contained within the gear unit cavity 11. In this context, it should be noted that apart from the advantages mentioned above, the single wall part 17 results in that the thermal conductivity between the motor unit 2 and the gear unit 3 is improved, where, according to some aspects, the gear oil can absorb some of the heat generated by the electric motor 4. Furthermore, the abutting surfaces 34, 35 provide an increased stability.

According to some aspects, the surfaces 34, 35 follow non-cylindrical shapes around the longitudinal axes 6, 15. This means that the surfaces 34, 35 can follow the general cross-sectional shape of the drill unit at the intersection between the motor unit 2 and the gear unit 3.

According to some aspects, the sealing flange 21 comprises a circumferentially running slot 19 that is adapted to receive a sealing gasket 20 that is adapted to function as a seal between the gear unit housing 18 and the motor unit housing 7. In this way, an improved sealing between the motor unit 2 and the gear unit 3 is obtained. In this example, the sealing gasket 20 is an O-ring, other types of sealing gaskets are of course conceivable.

Alternatively, the circumferentially running slot 19 that is adapted to receive the sealing gasket 20 can be formed at another part. For example, the gear unit housing 18 and the motor unit housing 7 comprise corresponding flange surfaces 36, 37 which run perpendicular to the longitudinal axes 6, 15 and which are adapted to abut each other, where the circumferentially running slot that is adapted to receive the sealing gasket can be formed in any one of these flange surfaces 36, 37. The sealing gasket can be an O-ring or a flat gasket. According to some aspects, the motor unit housing 7 is attached to the gear unit housing 18 with fastening means 29a, 29b where, according to some aspects, these fastening means 29a, 29b run via the flange surfaces 36, 37. The fastening means 29a, 29b can for example be constituted by screws or bolts. According to some aspects, the fastening means 29a, 29b engage the gear unit housing 18 and the motor unit housing 7 at a position radially outward of the sealing flange 14.

According to some aspects, the housing end part 9 comprises a circumferentially running first supporting flange 22 that extends from the wall part 17 towards and into the gear unit cavity 11 parallel with the first longitudinal axis 6, perpendicular to the extension of the wall part 17, where the first supporting flange 22 has a radial extension that encompasses the first longitudinal axis 6. The first supporting flange 22 comprises the motor exit aperture 8 and holds a bearing arrangement 23 and a radial seal 49 for the motor drive shaft 5, where the motor drive shaft 5 extends through the first supporting flange 22. This provides support for the motor drive shaft 5 and accommodation for the bearing arrangement 23. Furthermore, by means of the present disclosure where only one wall part 17 separates the gear unit cavity 11 and the electric motor 4, only one bearing arrangement is required for the motor drive shaft 5 at the transition from the motor unit 2 into the gear unit 3. As mentioned previously, the motor drive shaft 5 has a reduced length which lowers the risk of bending of the motor drive shaft, where the length in question runs from the bearing arrangement 23 to the end of the drive shaft gear 10.

According to some aspects, the housing end part 9 comprises at least one circumferentially running further supporting flange 24, 25 that extends from the wall part 17 towards and into the gear unit cavity 11 along an axis parallel with the first longitudinal axis 6, where each further supporting flange 24, 25 holds a corresponding bearing arrangement 26, 27 adapted to receive and support a corresponding gear shaft 14, 28 that is attached to a corresponding gear in the gear unit 3.

In this example there is a first gear shaft 14 that corresponds to the drill shaft and a second gear shaft 28, where the first gear shaft 14 is rotationally engaged with the outgoing gears 13, 43, and the second gear shaft 28 is rotationally engaged with the incoming gear 12 that in turn is adapted to mate with the drive shaft gear 10 as described previously.

A first supporting flange 24 comprises a first bearing arrangement 26 that is adapted to receive the first gear shaft 14, and a second supporting flange 25 holds a second bearing arrangement 27 that is adapted to receive the second gear shaft 28. In this manner, the gear shafts 14, 28 are securely fixed and journaled by means of the bearing arrangement 26, 27. The gear shafts 14, 28 are securely fixed and journaled in the gear unit 3 as well, as shown for the first gear shaft 14, the drill shaft 14, in FIG. 2 where the drill shaft 14 extends via a drill shaft bearing arrangement 38. The supporting flanges 22, 24, 25 thus have radially inner surfaces that are adapted to receive another part I the form of the motor drive shaft 5 and the gear shafts 14, 28.

In this context, a flange holding a bearing arrangement means that the flange is adapted to comprise a seat for the bearing arrangement According to some aspects, the sealing flange 21 circumvents the supporting flanges 22, 24, 25, and preferably supporting ridges 45, 46, 47, 48 run between the supporting flanges 22, 24, 25 and the sealing flange 21. According to some aspects, the supporting flanges 22, 24, 25 mainly have a cylindrical shape and may have common wall parts.

The present disclosure is not limited to the above, but may vary freely within the scope of the appended claims. For example, the electric motor 4 is powered by a battery 40. Such a battery is preferably rechargeable.

According to some aspects, drill tool 1 comprises a fan 39 for guiding cooling air towards the motor unit 2, wherein the cooling air is arranged to be guided to at least one side of the motor unit housing 7, said side being different from the side of the motor unit comprising the wall part 18, such that the motor unit 2 is directly cooled by a liquid, such as lubricating oil or grease, on one external side and by cooling air on at least one other external side. This provides for an efficient motor unit cooling by means of both air. For example, the cooling fan 39 is driven by the electric motor 4 and located on a side of the motor unit 2 opposite the side of the motor unit 2 engaging the gear unit cavity 11. In FIG. 1, arrows A1, A2 (not all arrows are indicated) illustrate cooling air flow.

Cooling air is led past the motor 4, along sides of the motor 4 and parallel to the first longitudinal axis 6, in particular past cooling flanges 50 comprised in the motor housing 7, and past the battery 40. The cooling air is guided by means of channels in the rear housing part 32. In this example, the motor unit 2 is closed, i.e. no cooling air flows into the motor housing 7, and heat generated by means of the motor 4 is mainly dissipated by means of the cooling flanges 50. The gear unit 3 is furthermore adapted to conduct heat away from the motor unit 2, where this heat transfer is enhanced by means of the fact that the motor unit housing 7 comprises the only wall part that separates the gear unit cavity 11 and the electric motor 4.

The term bearing arrangement can comprise any type of bearing, for example a ball bearing or a needle bearing.

In the examples above, the housing end part 9 comprises the circumferentially running sealing flange 21 that extends from the wall part 17 towards and into the gear unit cavity 11. According to some aspects, it is conceivable that, instead, the gear unit housing 18 comprises the circumferentially running sealing flange that extends into the housing end part 9.

The invention claimed is:

1. A drill tool comprising a motor unit and a gear unit, wherein the motor unit comprises an electric motor and a motor drive shaft that extends along a first longitudinal axis from the electric motor and protrudes out of a motor unit housing via a motor exit aperture in a housing end part and comprises a drive shaft gear, and wherein the gear unit comprises a gear unit housing with a gear unit cavity that in turn comprises at least one cavity gear, wherein the drive shaft gear is adapted to mate with a cavity gear that at least indirectly is adapted to propel a drill shaft that extends along a second longitudinal axis and comprises a tool holder that is adapted to hold a tool, wherein the housing end part comprises a wall part arranged transversally to the first and second longitudinal axes and is adapted to close the gear unit cavity and to separate the electric motor from the gear unit cavity,
wherein the motor unit housing comprises the wall part that separates the gear unit cavity and the electric motor, and
wherein the gear unit housing is open toward the wall part.

2. The drill tool according to claim 1, wherein the gear unit housing and the motor unit housing together are comprised in a drill tool main housing.

3. The drill tool according to claim 1, wherein the motor unit housing or the gear unit housing comprises a circumferentially running slot that is adapted to receive a sealing gasket that is adapted to function as a seal between the gear unit housing and the motor unit housing.

4. The drill tool according to claim 1, wherein the housing end part comprises a circumferentially running sealing flange that extends from the wall part towards and into the gear unit cavity parallel to the first and second longitudinal axes, such that the sealing flange and the gear unit cavity overlap in a direction perpendicular to the first and second longitudinal axes.

5. The drill tool according to claim 4, wherein the sealing flange and the gear unit housing have corresponding surfaces that are parallel to, and circumvent, the first and second longitudinal axes, and wherein the surfaces have complementary shapes where they abut each other.

6. The drill tool according to claim 5, wherein the surfaces follow non-cylindrical shapes around the first and second longitudinal axes.

7. The drill tool according to claim 4, wherein the sealing flange comprises a circumferentially running slot that is adapted to receive a sealing gasket that is adapted to function as a seal between the gear unit housing and the motor unit housing.

8. The drill tool according to claim 1, wherein the housing end part comprises a circumferentially running first supporting flange that extends from the wall part towards and into the gear unit cavity parallel with the first longitudinal axis, wherein the first supporting flange comprises the motor exit aperture and holds a bearing arrangement for the motor drive shaft, the motor drive shaft extending through the first supporting flange.

9. The drill tool according to claim 8, wherein the housing end part comprises at least one circumferentially running further supporting flange that extends from the wall part towards and into the gear unit cavity along an axis parallel with the first longitudinal axis, wherein each further supporting flange holds a corresponding bearing arrangement adapted to receive and support a corresponding gear shaft that is attached to a corresponding gear in the gear unit.

10. The drill tool according to claim 1, wherein the motor unit housing is attached to the gear unit housing with fastening means.

11. The drill tool according to claim 10, wherein the fastening means engage the gear unit housing and the motor unit housing at a position radially outward of a sealing flange.

12. The drill tool according to claim 1, wherein the gear unit cavity accommodates a lubricating oil or grease, and the wall part of the motor unit housing together with the gear unit cavity is arranged to encapsulate said liquid.

13. The drill tool according to claim 12, wherein the drill tool comprises a fan for guiding cooling air towards the motor unit, wherein the cooling air is arranged to be guided to at least one side of the motor unit housing, said at least one side being different from a side of the motor unit comprising the wall part, such that the motor unit is directly cooled by a liquid on one external side and by cooling air on at least one other external side.

14. The drill tool according to claim 13, wherein the cooling fan is driven by the electric motor and located on a side of the motor unit opposite the side of the motor unit engaging the gear unit cavity.

15. The drill tool according to claim 1, wherein the electric motor is powered by a battery.

16. The drill tool according to claim 1, wherein the at least one cavity gear comprises an incoming gear adapted to mate with the drive shaft gear, and an outgoing gear operably coupled to the incoming gear by means of at least one intermediate gear, wherein the outgoing gear is attached to the drill shaft.

* * * * *